United States Patent
Kahn et al.

(10) Patent No.: US 10,754,683 B1
(45) Date of Patent: *Aug. 25, 2020

(54) OPTIMIZING PREEMPTIVE OPERATING SYSTEM WITH MOTION SENSING

(71) Applicants: Philippe Richard Kahn, Santa Cruz, CA (US); Arthur Kinsolving, Santa Cruz, CA (US)

(72) Inventors: Philippe Richard Kahn, Santa Cruz, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,855

(22) Filed: Mar. 27, 2018

Related U.S. Application Data

(63) Continuation of application No. 14/936,629, filed on Nov. 9, 2015, now Pat. No. 9,940,161, which is a
(Continued)

(51) Int. Cl.
*G06F 9/48* (2006.01)
*G06F 9/50* (2006.01)
*G06N 5/02* (2006.01)

(52) U.S. Cl.
CPC ............. *G06F 9/48* (2013.01); *G06F 9/4818* (2013.01); *G06F 9/4843* (2013.01); *G06F 9/4881* (2013.01); *G06F 9/4887* (2013.01); *G06F 9/4893* (2013.01); *G06F 9/50* (2013.01); *G06F 9/5005* (2013.01); *G06F 9/5011* (2013.01);
(Continued)

(58) Field of Classification Search
CPC ........ G06F 9/48; G06F 9/4843; G06F 9/4881; G06F 9/4887; G06F 9/4893; G06F 9/50; G06F 9/5005; G06F 9/5011; G06F 9/5016; G06F 9/5027; G06F 9/5044; G06F 9/5055; G06F 9/5094
See application file for complete search history.

(56) References Cited

U.S. PATENT DOCUMENTS

| 4,238,146 A | 12/1980 | Kitamura et al. |
| 4,285,041 A | 8/1981 | Smith |

(Continued)

FOREIGN PATENT DOCUMENTS

| EP | 1104143 A2 | 5/2001 |
| EP | 0833537 B1 | 7/2002 |

(Continued)

OTHER PUBLICATIONS

"Access and Terminals (AT); Multimedia Message Service (MMS) for PSTN/ISDN; Multimedia Message Communication Between a Fixed Network Multimedia Message Terminal Equipment and a Multimedia Message Service Centre," ETSI AT-F Rapporteur Meeting, Feb. 4-6, 2003, Gothenburg, DES/AT-030023 V0.0.1 (Mar. 2003).

"Decrease Processor Power Consumption using a CoolRunner CPLD," Xilinx XAPP347 (v1.0), May 16, 2001, 9 pages.

"Sensor Fusion," <www.u-dynamics.com>, accessed Aug. 29, 2008, 2 pages.

Anderson, Ian, et al, "Shakra: Tracking and Sharing Daily Activity Levels with Unaugmented Mobile Phones," Mobile Netw Appl, Aug. 3, 2007, pp. 185-199.

(Continued)

*Primary Examiner* — Charles M Swift
(74) *Attorney, Agent, or Firm* — HIPLegal LLP; Judith Szepesi

(57) ABSTRACT

A method and apparatus to provide a scheduler comprising determining a current use characteristic for the device based on motion information and active applications, and scheduling a future task.

20 Claims, 7 Drawing Sheets

Related U.S. Application Data continuation of application No. 14/047,937, filed on Oct. 7, 2013, now Pat. No. 9,183,044, which is a continuation of application No. 11/829,813, filed on Jul. 27, 2007, now Pat. No. 8,555,282.

(52) U.S. Cl.
CPC .......... *G06F 9/5016* (2013.01); *G06F 9/5027* (2013.01); *G06F 9/5044* (2013.01); *G06F 9/5055* (2013.01); *G06F 9/5094* (2013.01); *G06N 5/02* (2013.01)

(56) References Cited

U.S. PATENT DOCUMENTS

| | | | |
|---|---|---|---|
| 4,571,680 A | 2/1986 | Wu | |
| 4,578,769 A | 3/1986 | Frederick | |
| 4,700,369 A | 10/1987 | Siegal et al. | |
| 4,776,323 A | 10/1988 | Spector | |
| 5,192,964 A | 3/1993 | Shinohara et al. | |
| 5,313,060 A | 5/1994 | Gast et al. | |
| 5,323,060 A | 6/1994 | Gast et al. | |
| 5,386,210 A | 1/1995 | Lee | |
| 5,430,480 A | 7/1995 | Allen et al. | |
| 5,446,725 A | 8/1995 | Ishiwatari | |
| 5,446,775 A | 8/1995 | Wright et al. | |
| 5,454,114 A | 9/1995 | Yach et al. | |
| 5,485,402 A | 1/1996 | Smith et al. | |
| 5,506,987 A | 4/1996 | Abramson | ............ G06F 9/5033 |
| | | | 718/103 |
| 5,515,419 A | 5/1996 | Sheffer | |
| 5,583,776 A | 12/1996 | Levi et al. | |
| 5,593,431 A | 1/1997 | Sheldon | |
| 5,654,619 A | 8/1997 | Iwashita | |
| 5,703,786 A | 12/1997 | Conkright | |
| 5,708,863 A | 1/1998 | Satoh et al. | |
| 5,717,611 A | 2/1998 | Terui et al. | |
| 5,737,439 A | 4/1998 | Lapsley et al. | |
| 5,771,001 A | 6/1998 | Cobb | |
| 5,778,882 A | 7/1998 | Raymond et al. | |
| 5,790,490 A | 8/1998 | Satoh et al. | |
| 5,911,065 A | 6/1999 | Williams | ............... G06F 9/4812 |
| | | | 718/102 |
| 5,955,667 A | 9/1999 | Fyfe | |
| 5,955,871 A | 9/1999 | Nguyen | |
| 5,960,085 A | 9/1999 | de la Huerga | |
| 5,976,083 A | 11/1999 | Richardson et al. | |
| 6,013,007 A | 1/2000 | Root et al. | |
| 6,061,456 A | 5/2000 | Andrea et al. | |
| 6,122,595 A | 9/2000 | Varley et al. | |
| 6,129,686 A | 10/2000 | Friedman | |
| 6,135,951 A | 10/2000 | Richardson et al. | |
| 6,145,389 A | 11/2000 | Ebeling et al. | |
| 6,246,321 B1 | 6/2001 | Rechsteiner et al. | |
| 6,282,496 B1 | 8/2001 | Chowdhary | |
| 6,336,891 B1 | 1/2002 | Fedrigon et al. | |
| 6,353,449 B1 | 3/2002 | Gregg et al. | |
| 6,369,794 B1 | 4/2002 | Sakurai et al. | |
| 6,374,054 B1 | 4/2002 | Schinner | |
| 6,396,883 B2 | 5/2002 | Yang et al. | |
| 6,408,330 B1 | 6/2002 | de la Huerga | |
| 6,428,490 B1 | 8/2002 | Kramer et al. | |
| 6,470,147 B1 | 10/2002 | Imada | |
| 6,478,736 B1 | 11/2002 | Mault | |
| 6,493,652 B1 | 12/2002 | Ohlenbusch et al. | |
| 6,496,695 B1 | 12/2002 | Kouji et al. | |
| 6,513,381 B2 | 2/2003 | Fyfe et al. | |
| 6,522,266 B1 | 2/2003 | Soehren et al. | |
| 6,529,144 B1 | 3/2003 | Nilsen et al. | |
| 6,532,419 B1 | 3/2003 | Begin et al. | |
| 6,539,336 B1 | 3/2003 | Vock et al. | |
| 6,595,929 B2 | 7/2003 | Stivoric et al. | |
| 6,601,016 B1 | 7/2003 | Brown et al. | |
| 6,607,493 B2 | 8/2003 | Song | |
| 6,609,004 B1 | 8/2003 | Morse | ................... G01S 5/0027 |
| | | | 455/456.5 |
| 6,611,789 B1 | 8/2003 | Darley | |
| 6,628,898 B2 | 9/2003 | Endo | |
| 6,634,992 B1 | 10/2003 | Ogawa | |
| 6,665,802 B1 | 12/2003 | Ober | |
| 6,672,991 B2 | 1/2004 | O'Malley | |
| 6,685,480 B2 | 2/2004 | Nishimoto et al. | |
| 6,700,499 B2 | 3/2004 | Kubo et al. | |
| 6,731,958 B1 | 5/2004 | Shirai | |
| 6,766,176 B1 | 7/2004 | Gupta et al. | |
| 6,771,250 B1 | 8/2004 | Oh | |
| 6,786,877 B2 | 9/2004 | Foxlin | |
| 6,788,980 B1 | 9/2004 | Johnson | |
| 6,790,178 B1 | 9/2004 | Mault et al. | |
| 6,807,564 B1 | 10/2004 | Zellner et al. | |
| 6,813,582 B2 | 11/2004 | Levi et al. | |
| 6,823,036 B1 | 11/2004 | Chen | |
| 6,826,477 B2 | 11/2004 | Ladetto et al. | |
| 6,836,744 B1 | 12/2004 | Asphahani et al. | |
| 6,881,191 B2 | 4/2005 | Oakley et al. | |
| 6,885,971 B2 | 4/2005 | Vock et al. | |
| 6,895,425 B1 | 5/2005 | Kadyk et al. | |
| 6,898,550 B1 | 5/2005 | Blackadar et al. | |
| 6,928,382 B2 | 8/2005 | Hong et al. | |
| 6,941,239 B2 | 9/2005 | Unuma et al. | |
| 6,959,259 B2 | 10/2005 | Vock et al. | |
| 6,975,959 B2 | 12/2005 | Dietrich et al. | |
| 6,997,852 B2 | 2/2006 | Watterson et al. | |
| 7,002,553 B2 | 2/2006 | Shkolnikov | |
| 7,010,332 B1 | 3/2006 | Irvin et al. | |
| 7,020,487 B2 | 3/2006 | Kimata | |
| 7,027,087 B2 | 4/2006 | Nozaki et al. | |
| 7,028,547 B2 | 4/2006 | Shiratori et al. | |
| 7,042,509 B2 | 5/2006 | Onuki | |
| 7,054,784 B2 | 5/2006 | Flentov et al. | |
| 7,057,551 B1 | 6/2006 | Vogt | |
| 7,072,789 B2 | 7/2006 | Vock et al. | |
| 7,089,508 B1 | 8/2006 | Wright | |
| 7,092,846 B2 | 8/2006 | Vock et al. | |
| 7,096,619 B2 | 8/2006 | Jackson et al. | |
| 7,148,797 B2 | 12/2006 | Albert | |
| 7,148,879 B2 | 12/2006 | Amento et al. | |
| 7,149,964 B1 | 12/2006 | Cottrille et al. | |
| 7,155,507 B2 | 12/2006 | Hirano et al. | |
| 7,158,912 B2 | 1/2007 | Vock et al. | |
| 7,169,084 B2 | 1/2007 | Tsuji | |
| 7,171,222 B2 | 1/2007 | Fostick | |
| 7,171,331 B2 | 1/2007 | Vock et al. | |
| 7,173,604 B2 | 2/2007 | Marvit et al. | |
| 7,176,886 B2 | 2/2007 | Marvit et al. | |
| 7,176,887 B2 | 2/2007 | Marvit et al. | |
| 7,176,888 B2 | 2/2007 | Marvit et al. | |
| 7,177,684 B1 | 2/2007 | Kroll et al. | |
| 7,180,500 B2 | 2/2007 | Marvit et al. | |
| 7,180,501 B2 | 2/2007 | Marvit et al. | |
| 7,180,502 B2 | 2/2007 | Marvit et al. | |
| 7,200,517 B2 | 4/2007 | Darley et al. | |
| 7,212,230 B2 | 5/2007 | Stavely | |
| 7,212,943 B2 | 5/2007 | Aoshima et al. | |
| 7,220,220 B2 | 5/2007 | Stubbs et al. | |
| 7,245,725 B1 | 7/2007 | Beard | |
| 7,254,516 B2 | 8/2007 | Case et al. | |
| 7,280,096 B2 | 10/2007 | Marvit et al. | |
| 7,280,849 B1 | 10/2007 | Bailey | |
| 7,297,088 B2 | 11/2007 | Tsuji | |
| 7,301,526 B2 | 11/2007 | Marvit et al. | |
| 7,301,527 B2 | 11/2007 | Marvit et al. | |
| 7,301,528 B2 | 11/2007 | Marvit et al. | |
| 7,301,529 B2 | 11/2007 | Marvit et al. | |
| 7,305,323 B2 | 12/2007 | Skvortsov et al. | |
| 7,328,611 B2 | 2/2008 | Klees et al. | |
| 7,334,472 B2 | 2/2008 | Seo et al. | |
| 7,353,112 B2 | 4/2008 | Choi et al. | |
| 7,365,735 B2 | 4/2008 | Reinhardt et al. | |
| 7,365,736 B2 | 4/2008 | Marvit et al. | |
| 7,365,737 B2 | 4/2008 | Marvit et al. | |
| 7,379,999 B1 | 5/2008 | Zhou et al. | |
| 7,382,611 B2 | 6/2008 | Tracy et al. | |

(56) References Cited

U.S. PATENT DOCUMENTS

| | | |
|---|---|---|
| 7,387,611 B2 | 6/2008 | Inoue et al. |
| 7,397,357 B2 | 7/2008 | Krumm et al. |
| 7,451,056 B2 | 11/2008 | Flentov et al. |
| 7,457,719 B1 | 11/2008 | Kahn et al. |
| 7,457,872 B2 | 11/2008 | Aton et al. |
| 7,463,997 B2 | 12/2008 | Pasolini et al. |
| 7,467,060 B2 | 12/2008 | Kulach et al. |
| 7,489,937 B2 | 2/2009 | Chung et al. |
| 7,502,643 B2 | 3/2009 | Farringdon et al. |
| 7,512,515 B2 | 3/2009 | Vock et al. |
| 7,526,402 B2 | 4/2009 | Tanenhaus et al. |
| 7,608,050 B2 | 10/2009 | Sugg |
| 7,640,804 B2 | 1/2010 | Daumer et al. |
| 7,647,196 B2 | 1/2010 | Kahn et al. |
| 7,653,508 B1 | 1/2010 | Kahn et al. |
| 7,664,657 B1 | 2/2010 | Letzt et al. |
| 7,689,107 B2 | 3/2010 | Enomoto |
| 7,705,884 B2 | 4/2010 | Pinto et al. |
| 7,736,272 B2 | 6/2010 | Martens |
| 7,752,011 B2 | 7/2010 | Niva et al. |
| 7,753,861 B1 | 7/2010 | Kahn et al. |
| 7,765,553 B2 | 7/2010 | Douceur ............... G06F 9/4881 718/102 |
| 7,774,156 B2 | 8/2010 | Niva et al. |
| 7,788,059 B1 | 8/2010 | Kahn et al. |
| 7,857,772 B2 | 12/2010 | Bouvier et al. |
| 7,881,902 B1 | 2/2011 | Kahn et al. |
| 7,892,080 B1 | 2/2011 | Dahl |
| 7,907,901 B1 | 3/2011 | Kahn et al. |
| 7,934,020 B1 * | 4/2011 | Xu ........................... G06F 9/485 709/223 |
| 7,987,070 B2 | 7/2011 | Kahn et al. |
| 8,187,182 B2 | 5/2012 | Kahn et al. |
| 8,275,635 B2 | 9/2012 | Stivoric et al. |
| 8,398,546 B2 | 3/2013 | Pacione et al. |
| 8,458,715 B1 | 6/2013 | Khosla ...................... G06F 9/50 702/104 |
| 8,555,282 B1 | 10/2013 | Kahn ................... G06F 9/4881 718/100 |
| 8,562,489 B2 | 10/2013 | Burton et al. |
| 8,790,279 B2 | 7/2014 | Brunner |
| 8,949,070 B1 | 2/2015 | kahn et al. |
| 8,996,332 B2 | 3/2015 | Kahn et al. |
| 9,183,044 B2 | 11/2015 | Kahn ................... G06F 9/4881 |
| 2001/0047488 A1 | 11/2001 | Verplaetse et al. |
| 2002/0006284 A1 | 1/2002 | Kim |
| 2002/0022551 A1 | 2/2002 | Watterson et al. |
| 2002/0023654 A1 | 2/2002 | Webb |
| 2002/0027164 A1 | 3/2002 | Mault et al. |
| 2002/0042830 A1 | 4/2002 | Bose et al. |
| 2002/0044634 A1 | 4/2002 | Rooke et al. |
| 2002/0054214 A1 | 5/2002 | Yoshikawa |
| 2002/0089425 A1 | 7/2002 | Kubo et al. |
| 2002/0091956 A1 | 7/2002 | Potter et al. |
| 2002/0109600 A1 | 8/2002 | Mault et al. |
| 2002/0118121 A1 | 8/2002 | Lehrman et al. |
| 2002/0122543 A1 | 9/2002 | Rowen |
| 2002/0138017 A1 | 9/2002 | Bui et al. |
| 2002/0142887 A1 | 10/2002 | O'Malley |
| 2002/0150302 A1 | 10/2002 | McCarthy et al. |
| 2002/0151810 A1 | 10/2002 | Wong et al. |
| 2002/0173295 A1 | 11/2002 | Nykanen et al. |
| 2002/0190947 A1 | 12/2002 | Feinstein |
| 2002/0193124 A1 | 12/2002 | Hamilton et al. |
| 2003/0018430 A1 | 1/2003 | Ladetto et al. |
| 2003/0033411 A1 | 2/2003 | Kavoori ............... G06F 9/44521 709/226 |
| 2003/0048218 A1 | 3/2003 | Milnes et al. |
| 2003/0083596 A1 | 5/2003 | Kramer et al. |
| 2003/0093187 A1 | 5/2003 | Walker et al. |
| 2003/0101260 A1 | 5/2003 | Dacier et al. |
| 2003/0109258 A1 | 6/2003 | Mantyjarvi et al. |
| 2003/0139692 A1 | 7/2003 | Barrey et al. |
| 2003/0139908 A1 | 7/2003 | Wegerich et al. |
| 2003/0149526 A1 | 8/2003 | Zhou et al. |
| 2003/0151672 A1 | 8/2003 | Robins et al. |
| 2003/0187683 A1 | 10/2003 | Kirchhoff et al. |
| 2003/0208110 A1 | 11/2003 | Mault et al. |
| 2003/0208113 A1 | 11/2003 | Mault et al. |
| 2003/0227487 A1 | 12/2003 | Hugh |
| 2003/0236625 A1 | 12/2003 | Brown et al. |
| 2004/0017300 A1 | 1/2004 | Kotzin et al. |
| 2004/0024846 A1 | 2/2004 | Randall et al. |
| 2004/0043760 A1 | 3/2004 | Rosenfeld et al. |
| 2004/0044493 A1 | 3/2004 | Coulthard |
| 2004/0047498 A1 | 3/2004 | Mulet-Parada et al. |
| 2004/0078219 A1 | 4/2004 | Kaylor et al. |
| 2004/0078220 A1 | 4/2004 | Jackson |
| 2004/0081441 A1 | 4/2004 | Sato et al. |
| 2004/0106421 A1 | 6/2004 | Tomiyoshi et al. |
| 2004/0106958 A1 | 6/2004 | Mathis et al. |
| 2004/0122294 A1 | 6/2004 | Hatlestad et al. |
| 2004/0122295 A1 | 6/2004 | Hatlestad et al. |
| 2004/0122296 A1 | 6/2004 | Hatlestad et al. |
| 2004/0122297 A1 | 6/2004 | Stahmann et al. |
| 2004/0122333 A1 | 6/2004 | Nissila |
| 2004/0122484 A1 | 6/2004 | Hatlestad et al. |
| 2004/0122485 A1 | 6/2004 | Stahmann et al. |
| 2004/0122486 A1 | 6/2004 | Stahmann et al. |
| 2004/0122487 A1 | 6/2004 | Hatlestad et al. |
| 2004/0125073 A1 | 7/2004 | Potter et al. |
| 2004/0130628 A1 | 7/2004 | Stavely |
| 2004/0135898 A1 | 7/2004 | Zador |
| 2004/0146048 A1 | 7/2004 | Cotte |
| 2004/0148340 A1 | 7/2004 | Cotte |
| 2004/0148341 A1 | 7/2004 | Cotte |
| 2004/0148342 A1 | 7/2004 | Cotte |
| 2004/0148351 A1 | 7/2004 | Cotte |
| 2004/0176067 A1 | 9/2004 | Lakhani et al. |
| 2004/0185821 A1 | 9/2004 | Yuasa |
| 2004/0219910 A1 | 11/2004 | Beckers |
| 2004/0225467 A1 | 11/2004 | Vock et al. |
| 2004/0236500 A1 | 11/2004 | Choi et al. |
| 2004/0242202 A1 | 12/2004 | Torvinen |
| 2004/0247030 A1 | 12/2004 | Wiethoff |
| 2004/0259494 A1 | 12/2004 | Mazar |
| 2005/0015768 A1 | 1/2005 | Moore ................... G06F 9/4881 718/102 |
| 2005/0027567 A1 | 2/2005 | Taha |
| 2005/0033200 A1 | 2/2005 | Soehren et al. |
| 2005/0038691 A1 | 2/2005 | Babu |
| 2005/0048945 A1 | 3/2005 | Porter |
| 2005/0048955 A1 | 3/2005 | Ring |
| 2005/0078197 A1 | 4/2005 | Gonzales |
| 2005/0079873 A1 | 4/2005 | Caspi et al. |
| 2005/0079877 A1 | 4/2005 | Ichimura ................ G01C 21/32 455/456.1 |
| 2005/0081200 A1 | 4/2005 | Rutten .................. G06F 9/4881 718/100 |
| 2005/0101841 A9 | 5/2005 | Kaylor et al. |
| 2005/0102167 A1 | 5/2005 | Kapoor |
| 2005/0107944 A1 | 5/2005 | Hovestadt et al. |
| 2005/0113649 A1 | 5/2005 | Bergantino |
| 2005/0113650 A1 | 5/2005 | Pacione et al. |
| 2005/0125797 A1 | 6/2005 | Gabrani ................... G06F 9/505 718/100 |
| 2005/0131736 A1 | 6/2005 | Nelson et al. |
| 2005/0141522 A1 | 6/2005 | Kadar et al. |
| 2005/0143106 A1 | 6/2005 | Chan et al. |
| 2005/0146431 A1 | 7/2005 | Hastings et al. |
| 2005/0157181 A1 | 7/2005 | Kawahara et al. |
| 2005/0165719 A1 | 7/2005 | Greenspan et al. |
| 2005/0168587 A1 | 8/2005 | Sato et al. |
| 2005/0182824 A1 | 8/2005 | Cotte |
| 2005/0183086 A1 | 8/2005 | Abe ....................... G06F 9/4881 718/100 |
| 2005/0202934 A1 | 9/2005 | Olrik et al. |
| 2005/0203430 A1 | 9/2005 | Williams et al. |
| 2005/0210300 A1 | 9/2005 | Song et al. |
| 2005/0210419 A1 | 9/2005 | Kela et al. |
| 2005/0212751 A1 | 9/2005 | Marvit et al. |
| 2005/0212752 A1 | 9/2005 | Marvit et al. |
| 2005/0212753 A1 | 9/2005 | Marvit et al. |

(56) References Cited

U.S. PATENT DOCUMENTS

| | | |
|---|---|---|
| 2005/0212760 A1 | 9/2005 | Marvit et al. |
| 2005/0216403 A1 | 9/2005 | Tam et al. |
| 2005/0222801 A1 | 10/2005 | Wulff et al. |
| 2005/0232388 A1 | 10/2005 | Tsuji |
| 2005/0232404 A1 | 10/2005 | Gaskill |
| 2005/0234676 A1 | 10/2005 | Shibayama |
| 2005/0235058 A1 | 10/2005 | Rackus et al. |
| 2005/0238132 A1 | 10/2005 | Tsuji |
| 2005/0240375 A1 | 10/2005 | Sugai |
| 2005/0243178 A1 | 11/2005 | McConica |
| 2005/0245988 A1 | 11/2005 | Miesel |
| 2005/0248718 A1 | 11/2005 | Howell et al. |
| 2005/0256414 A1 | 11/2005 | Kettunen et al. |
| 2005/0258938 A1 | 11/2005 | Moulson |
| 2005/0262237 A1 | 11/2005 | Fulton et al. |
| 2005/0281289 A1 | 12/2005 | Huang et al. |
| 2006/0009243 A1 | 1/2006 | Dahan et al. |
| 2006/0010699 A1 | 1/2006 | Tamura |
| 2006/0017692 A1 | 1/2006 | Wehrenberg et al. |
| 2006/0020177 A1 | 1/2006 | Seo et al. |
| 2006/0026212 A1 | 2/2006 | Tsukerman ....... G06F 17/30289 |
| 2006/0029284 A1 | 2/2006 | Stewart |
| 2006/0040793 A1 | 2/2006 | Martens |
| 2006/0063980 A1 | 3/2006 | Hwang et al. |
| 2006/0064276 A1 | 3/2006 | Ren et al. |
| 2006/0068919 A1 | 3/2006 | Gottfurcht |
| 2006/0080551 A1 | 4/2006 | Mantyjarvi et al. |
| 2006/0090088 A1 | 4/2006 | Choi et al. |
| 2006/0090161 A1 | 4/2006 | Bodas et al. |
| 2006/0098097 A1 | 5/2006 | Wach et al. |
| 2006/0100546 A1 | 5/2006 | Silk |
| 2006/0109113 A1 | 5/2006 | Reyes et al. |
| 2006/0136173 A1 | 6/2006 | Case, Jr. et al. |
| 2006/0140422 A1 | 6/2006 | Zurek et al. |
| 2006/0149516 A1 | 7/2006 | Bond et al. |
| 2006/0154642 A1 | 7/2006 | Scannell, Jr. |
| 2006/0161377 A1 | 7/2006 | Rakkola et al. |
| 2006/0161459 A9 | 7/2006 | Rosenfeld et al. |
| 2006/0167387 A1 | 7/2006 | Buchholz et al. |
| 2006/0167647 A1 | 7/2006 | Krumm et al. |
| 2006/0167943 A1 | 7/2006 | Rosenberg |
| 2006/0172706 A1 | 8/2006 | Griffin et al. |
| 2006/0174685 A1 | 8/2006 | Skvortsov et al. |
| 2006/0201964 A1 | 9/2006 | DiPerna et al. |
| 2006/0204214 A1 | 9/2006 | Shah et al. |
| 2006/0205406 A1 | 9/2006 | Pekonen et al. |
| 2006/0206258 A1 | 9/2006 | Brooks |
| 2006/0223547 A1 | 10/2006 | Chin et al. |
| 2006/0249683 A1 | 11/2006 | Goldberg et al. |
| 2006/0256082 A1 | 11/2006 | Cho et al. |
| 2006/0257042 A1 | 11/2006 | Ofek et al. |
| 2006/0259268 A1 | 11/2006 | Vock et al. |
| 2006/0259574 A1* | 11/2006 | Rosenberg .............. H04L 67/04 709/217 |
| 2006/0284979 A1 | 12/2006 | Clarkson |
| 2006/0288781 A1 | 12/2006 | Daumer et al. |
| 2006/0289819 A1 | 12/2006 | Parsons et al. |
| 2007/0004451 A1 | 1/2007 | Anderson |
| 2007/0005988 A1 | 1/2007 | Zhang et al. |
| 2007/0017136 A1 | 1/2007 | Mosher et al. |
| 2007/0024441 A1 | 2/2007 | Kahn et al. |
| 2007/0037605 A1 | 2/2007 | Logan |
| 2007/0037610 A1 | 2/2007 | Logan |
| 2007/0038364 A1 | 2/2007 | Lee et al. |
| 2007/0040892 A1 | 2/2007 | Aoki et al. |
| 2007/0050157 A1 | 3/2007 | Kahn et al. |
| 2007/0060446 A1 | 3/2007 | Asukai et al. |
| 2007/0061105 A1 | 3/2007 | Darley et al. |
| 2007/0063850 A1 | 3/2007 | Devaul et al. |
| 2007/0067094 A1 | 3/2007 | Park et al. |
| 2007/0072158 A1 | 3/2007 | Unuma et al. |
| 2007/0072581 A1 | 3/2007 | Aerrabotu |
| 2007/0073482 A1 | 3/2007 | Churchill et al. |
| 2007/0075127 A1 | 4/2007 | Rosenberg |
| 2007/0075965 A1 | 4/2007 | Huppi et al. |
| 2007/0078324 A1 | 4/2007 | Wijisiriwardana |
| 2007/0082789 A1 | 4/2007 | Nisslia et al. |
| 2007/0102525 A1 | 5/2007 | Orr et al. |
| 2007/0104479 A1 | 5/2007 | Machida |
| 2007/0106991 A1 | 5/2007 | Yoo .......................... G06F 9/485 718/103 |
| 2007/0125852 A1 | 6/2007 | Rosenberg |
| 2007/0130582 A1 | 6/2007 | Chang et al. |
| 2007/0142715 A1 | 6/2007 | Benet et al. |
| 2007/0143068 A1 | 6/2007 | Pasolini et al. |
| 2007/0143765 A1* | 6/2007 | Aridor .................. G06F 9/5011 718/104 |
| 2007/0145680 A1 | 6/2007 | Rosenberg |
| 2007/0150136 A1 | 6/2007 | Doll et al. |
| 2007/0156364 A1 | 7/2007 | Rothkopf |
| 2007/0161410 A1 | 7/2007 | Huang et al. |
| 2007/0165790 A1 | 7/2007 | Taori |
| 2007/0169126 A1 | 7/2007 | Todoroki ............... G06F 9/4881 718/103 |
| 2007/0176776 A1 | 8/2007 | Kashiwagi et al. |
| 2007/0176898 A1 | 8/2007 | Suh |
| 2007/0192483 A1 | 8/2007 | Rezvani et al. |
| 2007/0195784 A1 | 8/2007 | Allen et al. |
| 2007/0204744 A1 | 9/2007 | Sako et al. |
| 2007/0208531 A1 | 9/2007 | Darley et al. |
| 2007/0208544 A1 | 9/2007 | Kulach et al. |
| 2007/0213085 A1 | 9/2007 | Fedora |
| 2007/0213126 A1 | 9/2007 | Deutsch et al. |
| 2007/0219708 A1 | 9/2007 | Brasche ................. G01C 21/32 701/457 |
| 2007/0221045 A1 | 9/2007 | Terauchi et al. |
| 2007/0225935 A1 | 9/2007 | Ronkainen et al. |
| 2007/0233788 A1 | 10/2007 | Bender |
| 2007/0239399 A1 | 10/2007 | Sheynblat et al. |
| 2007/0250261 A1 | 10/2007 | Soehren |
| 2007/0259685 A1 | 11/2007 | Engblom et al. |
| 2007/0259716 A1 | 11/2007 | Mattice et al. |
| 2007/0259717 A1 | 11/2007 | Mattice et al. |
| 2007/0260418 A1 | 11/2007 | Ladetto et al. |
| 2007/0260482 A1 | 11/2007 | Nurmela et al. |
| 2007/0263995 A1 | 11/2007 | Park et al. |
| 2007/0281762 A1 | 12/2007 | Barros et al. |
| 2007/0296696 A1 | 12/2007 | Nurmi |
| 2008/0005738 A1 | 1/2008 | Imai ........................ G06F 9/485 718/100 |
| 2008/0030586 A1 | 2/2008 | Helbing et al. |
| 2008/0046888 A1 | 2/2008 | Appaji .................. G06F 9/4843 718/102 |
| 2008/0052716 A1 | 2/2008 | Theurer ................ G06F 9/4856 718/103 |
| 2008/0072014 A1 | 3/2008 | Krishnan et al. |
| 2008/0082994 A1 | 4/2008 | Ito et al. |
| 2008/0086734 A1 | 4/2008 | Jensen .................. G06F 9/4881 718/104 |
| 2008/0102785 A1 | 5/2008 | Childress et al. |
| 2008/0109158 A1 | 5/2008 | Huhtala et al. |
| 2008/0113689 A1 | 5/2008 | Bailey |
| 2008/0114538 A1 | 5/2008 | Lindroos |
| 2008/0120520 A1 | 5/2008 | Eriksson |
| 2008/0125959 A1 | 5/2008 | Doherty ............ G06F 17/30241 701/532 |
| 2008/0140338 A1 | 6/2008 | No ........................ G01C 22/006 702/141 |
| 2008/0153671 A1 | 6/2008 | Ogg et al. |
| 2008/0161072 A1 | 7/2008 | Lide et al. |
| 2008/0165022 A1 | 7/2008 | Herz et al. |
| 2008/0168361 A1 | 7/2008 | Forstall et al. |
| 2008/0171918 A1 | 7/2008 | Teller et al. |
| 2008/0214358 A1 | 9/2008 | Ogg et al. |
| 2008/0231713 A1 | 9/2008 | Florea et al. |
| 2008/0231714 A1 | 9/2008 | Estevez et al. |
| 2008/0232604 A1 | 9/2008 | Dufresne et al. |
| 2008/0243432 A1 | 10/2008 | Kato et al. |
| 2008/0254944 A1 | 10/2008 | Muri et al. |
| 2008/0303681 A1 | 12/2008 | Herz et al. |
| 2008/0311929 A1 | 12/2008 | Carro .................. H04M 1/72566 455/456.3 |
| 2009/0017880 A1 | 1/2009 | Moore et al. |

(56) References Cited

U.S. PATENT DOCUMENTS

| | | |
|---|---|---|
| 2009/0024233 A1 | 1/2009 | Shirai et al. |
| 2009/0031319 A1 | 1/2009 | Fecioru .................. G06F 9/4881 718/103 |
| 2009/0043531 A1 | 2/2009 | Kahn et al. |
| 2009/0047645 A1 | 2/2009 | Dibenedetto et al. |
| 2009/0067826 A1 | 3/2009 | Shinohara et al. |
| 2009/0082994 A1 | 3/2009 | Schuler et al. |
| 2009/0088204 A1 | 4/2009 | Culbert et al. |
| 2009/0098880 A1 | 4/2009 | Lindquist |
| 2009/0099668 A1 | 4/2009 | Lehman et al. |
| 2009/0099812 A1 | 4/2009 | Kahn et al. |
| 2009/0124348 A1 | 5/2009 | Yoseloff et al. |
| 2009/0124938 A1 | 5/2009 | Brunner |
| 2009/0128448 A1 | 5/2009 | Riechel |
| 2009/0174782 A1 | 7/2009 | Kahn et al. |
| 2009/0213002 A1 | 8/2009 | Rani et al. |
| 2009/0215502 A1 | 8/2009 | Griffin |
| 2009/0234614 A1 | 9/2009 | Kahn et al. |
| 2009/0274317 A1 | 11/2009 | Kahn et al. |
| 2009/0296951 A1 | 12/2009 | De Haan |
| 2009/0319221 A1 | 12/2009 | Kahn et al. |
| 2009/0325705 A1 | 12/2009 | Filer et al. |
| 2010/0056872 A1 | 3/2010 | Kahn et al. |
| 2010/0057398 A1 | 3/2010 | Darley et al. |
| 2010/0199189 A1 | 8/2010 | Ben-Aroya et al. |
| 2010/0245131 A1 | 9/2010 | Graumann |
| 2010/0277489 A1 | 11/2010 | Geisner |
| 2010/0283742 A1 | 11/2010 | Lam |
| 2011/0003665 A1 | 1/2011 | Burton et al. |
| 2012/0092157 A1 | 4/2012 | Tran |
| 2014/0369522 A1 | 12/2014 | Asukai et al. |

FOREIGN PATENT DOCUMENTS

| | | |
|---|---|---|
| EP | 1988492 A1 | 11/2008 |
| GB | 2431813 A | 5/2007 |
| JP | 7020547 | 1/1995 |
| JP | 200090069 | 3/2000 |
| JP | 2001057695 A | 2/2001 |
| JP | 2003108154 A | 4/2003 |
| JP | 2003143683 A | 5/2003 |
| JP | 2005167758 A | 6/2005 |
| JP | 2005260944 | 9/2005 |
| JP | 2005277995 A | 10/2005 |
| JP | 2005309691 | 11/2005 |
| JP | 2006026092 A | 2/2006 |
| JP | 2006118909 | 5/2006 |
| JP | 2006239398 A | 9/2006 |
| JP | 2006287730 A | 10/2006 |
| JP | 2007080219 | 3/2007 |
| JP | 2007104670 A | 4/2007 |
| JP | 2007121694 A | 5/2007 |
| JP | 2007142611 A | 6/2007 |
| JP | 2007193908 | 8/2007 |
| WO | WO9922338 | 5/1999 |
| WO | WO0063874 | 10/2000 |
| WO | WO02088926 | 11/2002 |

OTHER PUBLICATIONS

Ang, Wei Tech, et al, "Zero Phase Filtering for Active Compensation of Periodic Physiological Motion," Proc 1st IEEE /RAS-EMBS International Conference on Biomedical Robotics and Biomechatronics, Feb. 20-22, 2006, pp. 182-187.

Aylward, Ryan, et al, "Sensemble: A Wireless, Compact, Multi-User Sensor System for Interactive Dance," International Conference on New Interfaces for Musical Expression (NIME06), Jun. 4-8, 2006, pp. 134-139.

Baca, Arnold, et al, "Rapid Feedback Systems for Elite Sports Training," IEEE Pervasive Computing, Oct.-Dec. 2006, pp. 70-76.

Bakhru, Kesh, "A Seamless Tracking Solution for Indoor and Outdoor Position Location," IEEE 16th International Symposium on Personal, Indoor, and Mobile Radio Communications, 2005, pp. 2029-2033.

Bliley, Kara E, et al, "A Miniaturized Low Power Personal Motion Analysis Logger Utilizing MEMS Accelerometers and Low Power Microcontroller," IEEE EMBS Special Topic Conference on Microtechnologies in Medicine and Biology, May 12-15, 2005, pp. 92-93.

Bourzac, Katherine "Wearable Health Reports," Technology Review, Feb. 28, 2006, <http://www.techreview.com/printer.sub.--friendly.sub.-article.-sub.-aspx?id+16431>, Mar. 22, 2007, 3 pages.

Cheng, et al, "Periodic Human Motion Description for Sports Video Databases," Proceedings of the Pattern Recognition, 2004, 8 pages.

Dao, Ricardo, "Inclination Sensing with Thermal Accelerometers", MEMSIC, May 2002, 3 pages.

Fang, Lei, et al, "Design of a Wireless Assisted Pedestrian Dead Reckoning System—The NavMote Experience," IEEE Transactions on Instrumentation and Measurement, vol. 54, No. 6, Dec. 2005, pp. 2342-2358.

Healey, Jennifer, et al, "Wearable Wellness Monitoring Using ECG and Accelerometer Data," IEEE Int. Symposium on Wearable Computers (ISWC'05), 2005, 2 pages.

Hemmes, Jeffrey, et al, "Lessons Learned Building TeamTrak: An Urban/Outdoor Mobile Testbed," 2007 IEEE Int. Conf. on Wireless Algorithms, Aug. 1-3, 2007, pp. 219-224.

Jones, L, et al, "Wireless Physiological Sensor System for Ambulatory Use," <http://ieeexplore.ieee.org/xpl/freeabs.sub.-all.jsp?tp=&arnumb-er=1612917&isnumber=33861>, Apr. 3-5, 2006, 1 page.

Jovanov, Emil, et al, "A Wireless Body Area Network of Intelligent Motion Sensors for Computer Assisted Physical Rehabilitation," Journal of NeuroEngineering and Rehabilitation, Mar. 2005, 10 pages.

Kalpaxis, Alex, "Wireless Temporal-Spatial Human Mobility Analysis Using Real-Time Three Dimensional Acceleration Data," IEEE Intl. Multi-Cont on Computing in Global IT (ICCGI'07), 2007, 7 pages.

Lee, Hyunseok, et al, A Dual Processor Solution for the MAC Layer of a Software Defined Radio Terminal, Advanced Computer Architecture Laboratory, University of Michigan, 25 pages.

Lee, Seon-Woo, et al., "Recognition of Walking Behaviors for Pedestrian Navigation," ATR Media Integration & Communications Research Laboratories, Kyoto, Japan, pp. 1152-1155.

Margaria, Rodolfo, "Biomechanics and Energetics of Muscular Exercise", Chapter 3, Oxford: Clarendon Press 1976, pp. 105-125.

Milenkovic, Milena, et al, "An Accelerometer-Based Physical Rehabilitation System," IEEE SouthEastern Symposium on System Theory, 2002, pp. 57-60.

Mizell, David, "Using Gravity to Estimate Accelerometer Orientation", Seventh IEEE International Symposium on Wearable Computers, 2003, 2 pages.

Ormoneit, D, et al, Learning and Tracking of Cyclic Human Motion: Proceedings of NIPS 2000, Neural Information Processing Systems, 2000, Denver, CO, pp. 894-900.

Otto, Chris, et al, "System Architecture of a Wireless Body Area Sensor Network for Ubiquitous Health Monitoring," Journal of Mobile Multimedia, vol. 1, No. 4, 2006, pp. 307-326.

Park, Chulsung, et al, "Eco: An Ultra-Compact Low-Power Wireless Sensor Node for Real-Time Motion Monitoring," IEEE Int Symp. on Information Processing in Sensor Networks, 2005, pp. 398-403.

Ricoh, "Advanced digital technology changes creativity," <http://www.ricoh.com/r.sub.--dc/gx/gx200/features2.html>, Accessed May 12, 2011, 4 pages.

Shen, Chien-Lung, et al, "Wearable Band Using a Fabric-Based Sensor for Exercise ECG Monitoring," IEEE Int. Symp. on Wearable Computers, 2006, 2 pages.

Tapia, Emmanuel Munguia, et al, "Real-Time Recognition of Physical Activities and Their Intensities Using Wireless Accelerometers and a Heart Rate Monitor," IEEE Cont. on Wearable Computers, Oct. 2007, 4 pages.

Tech, Ang Wei, "Real-time Image Stabilizer," <http://www.mae.ntu.edu.sg/ABOUTMAE/DIVISIONS/RRC.sub.-BIOROBOTICS/Pa-ges/rtimage.aspx>, Mar. 23, 2009, 3 pages.

Wang, Shu, et al, "Location Based Services for Mobiles: Technologies and Standards, LG Electronics MobileComm," IEEE ICC 2008, Beijing, pp. 1-66 (part 1 of 3).

(56) References Cited

OTHER PUBLICATIONS

Wang, Shu, et al, "Location Based Services for Mobiles: Technologies and Standards, LG Electronics MobileComm," IEEE ICC 2008, Beijing, pp. 67-92 (part 2 of 3).

Wang, Shu, et al, "Location Based Services for Mobiles: Technologies and Standards, LG Electronics MobileComm," IEEE ICC 2008, Beijing, pp. 93-123 (part 3 of 3).

Weckesser, P, et al, "Multiple Sensorprocessing for High-Precision Navigation and Environmental Modeling with a Mobile Robot," IEEE, 1995, pp. 453-458.

Weinberg, Harvey, "MEMS Motion Sensors Boost Handset Reliability" Jun. 2006, http://www.mwrf.com/Articles/Print.cfm?ArticleID=12740>, Feb. 21, 2007, 4 pages.

Weinberg, Harvey, "Minimizing Power Consumption of iMEMS. RTM. Accelerometers," Analog Devices, <http://www.analog.com/static/imported-files/application.sub.-notes/5-935151853362884599AN601.pdf>, 2002, 5 pages.

Wixted, Andrew J, et al, "Measurement of Energy Expenditure in Elite Athletes Using MEMS-Based Triaxial Accelerometers," IEEE Sensors Journal, vol. 7, No. 4, Apr. 2007, pp. 481-488.

Wu, Winston H, et al, "Context-Aware Sensing of Physiological Signals," IEEE Int. Conf. on Engineering for Medicine and Biology, Aug. 23-26, 2007, pp. 5271-5275.

Yoo, Chang-Sun, et al, "Low Cost GPS/INS Sensor Fusion System for UAV Navigation," IEEE, 2003, 9 pages.

Zypad WL 1100 Wearable Computer, <http://www.eurotech.fi/products/manuals/Zypad%20WL%201100.sub.--sf.pd-f>, Jan. 16, 2008, 2 pgs.

\* cited by examiner

| Task | Resources Used |
|---|---|
| Game 1 | UI, storage bandwidth, RAM, non-volatile memory |
| Game 2 | UI, storage bandwidth, RAM, network bandwidth |
| Phone | Network bandwidth |
| Download | Network bandwidth, storage bandwidth, non-volatile memory |
| Application | UI, RAM |
| etc. | |

Fig. 5

OPTIMIZING PREEMPTIVE OPERATING SYSTEM WITH MOTION SENSING

The present patent application is a continuation of U.S. application Ser. No. 14/936,629, filed on Nov. 9, 2015, issued as U.S. Pat. No. 9,940,161 on Apr. 10, 2018, which is a continuation of U.S. application Ser. No. 14/047,937, filed on Oct. 7, 2015, issuing as U.S. Pat. No. 9,183,044 on Nov. 10, 2015, which is a continuation of U.S. application Ser. No. 11/829,813, filed on Jul. 27, 2007, now U.S. Pat. No. 8,555,282, which issued on Oct. 8, 2013, all of which are incorporated herein by reference.

FIELD OF THE INVENTION

The present invention relates to preemptive operating systems, and more particularly to scheduling in preemptive operating systems.

BACKGROUND

Mobile devices are gaining increasing functionality and importance in our daily lives. Accelerometers may be incorporated in these devices for measuring the motion that the device experiences. More and more of these mobile devices have multi-tasking preemptive operating systems that allow the device to run several programs or applications at once. These preemptive operating systems have schedulers to prioritize tasks. In prior implementations, these schedulers based their decision on the priority of each application or function, and occasionally on the time of day.

SUMMARY OF THE INVENTION

A method and apparatus to provide a scheduler comprising determining a current use characteristic for a device based on motion information and active applications, and scheduling a future task.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a list of exemplary tasks and the associated resources used.

DETAILED DESCRIPTION

The method and apparatus described is for providing a preemptive operating system, which schedules tasks in a mobile device. Prior art schedulers have had no awareness as to the motion that the device is experiencing and in particular what the user's motion implies about the state of the device and the likelihood of the user to perform certain actions with the device. In prior art, these schedulers know only of the current state of various programs and whether the device has the screen turned on or off but have no awareness of the motion that a device is experiencing.

The scheduler of the present invention in one embodiment optimizes these preemptive operating environments using motion information. The scheduler optimizes tasks, programs, and data communications based upon the device's use characteristic, determined based on the motion information. Data communications may include pulling data from and pushing data to the network.

While the scheduler improves the performance of all programs on a mobile device, some programs require especially low latency in their execution in order to operate accurately. In particular, programs that receive and process the input from integrated or wirelessly tethered sensors degrade rapidly in performance and accuracy as latency increases. Many of these sensor programs analyze data in real time, sampling a sensor from 1 to 300+Hz. In a preemptive operating system where the host processor interfaces directly with a given sensor, a higher priority task such as a phone call or data transfer will preempt the lower priority task of real time data analysis. If system bandwidth is limited, the lower priority task may be halted entirely, significantly degrading the program's performance.

Figure 1:
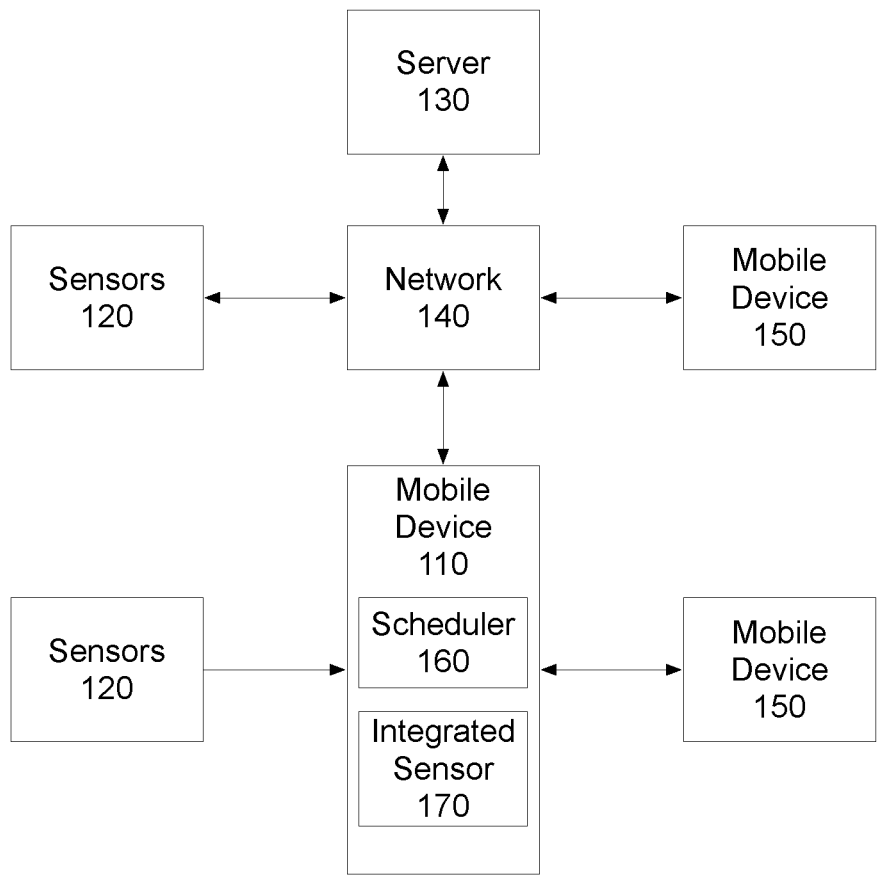
FIG. 1 is a network diagram illustrating a network in which the present system may work.

FIG. 1 is a network diagram illustrating a network in which the present system may work. The system includes a mobile device 110. The mobile device 110, in one embodiment, receives data from one or more sensors 120, 170. The sensors 120, 170 may be coupled to the mobile device 110 via a wireless connection 120 such as 802.11 WiFi, Bluetooth, etc or may be integrated in the mobile device 170. The integrated sensors 170, in one embodiment include an inertial sensor. The mobile device 110 can also retrieve data from a server 130 via network 140, or send data to a server 130 via network 140. The network may be the Internet, a cellular telephone network, or any other network. The mobile device 110 may be getting data from the network via various protocols including Wireless Access Protocol (WAP), HTTP, or other protocols.

The mobile device 110 may also obtain data from other another mobile device 150 either through a direct connection or through network. The scheduler 160 in mobile device 110 determines when the various tasks and communications occur. This may include obtaining data from, and sending data to, servers 130, sensors 120, and other mobile devices 150, as well as internal processes such as programs and tasks.

Figure 2:
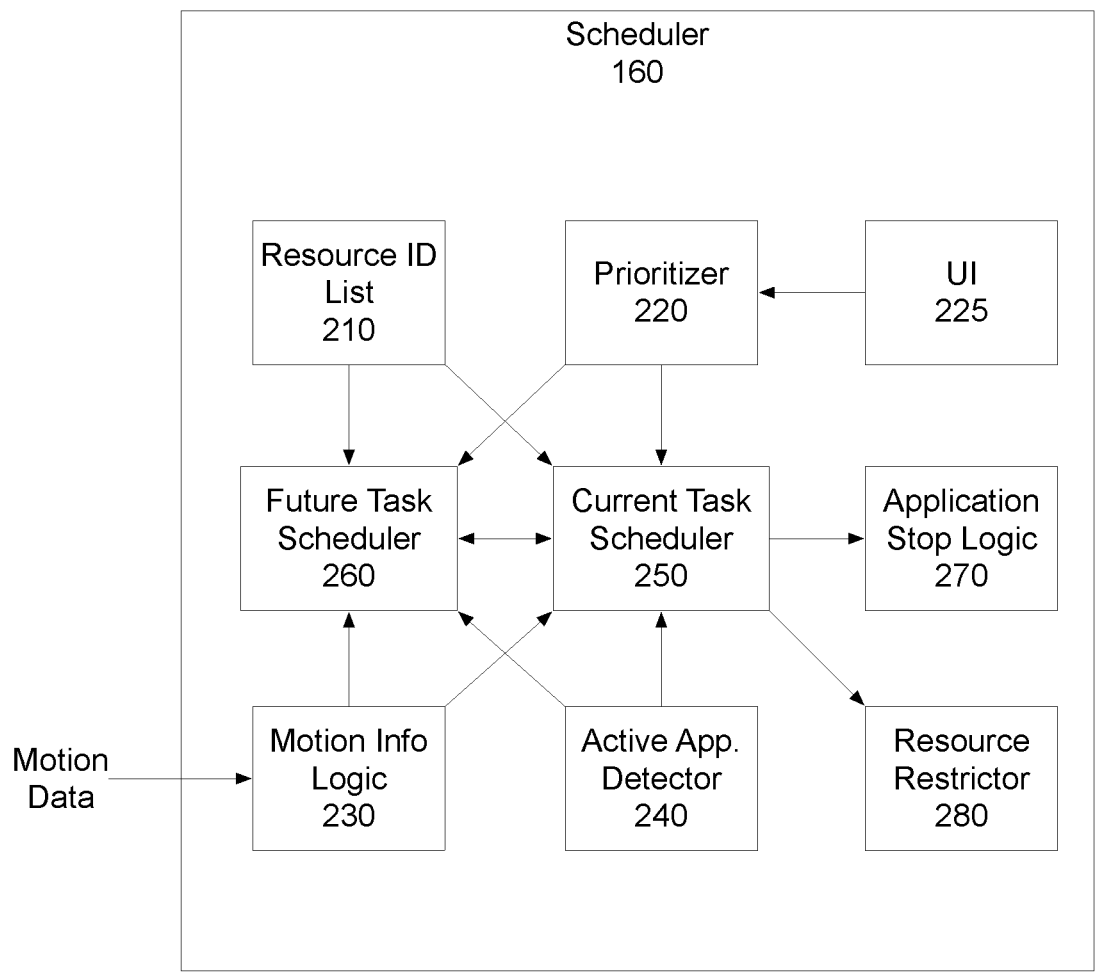
FIG. 2 is a block diagram of one embodiment of the scheduler.

FIG. 2 is a block diagram of one embodiment of the scheduler. The scheduler 160 in one embodiment is a software application which runs on a mobile device. In another embodiment, the scheduler 160 may have a client and a server component. The functionality may be split between the client and the server. In one embodiment, the preference settings, and calculations may be on the server which has more processing power and storage available, while the implementation/use aspects reside on the client. For simplicity, the below description refers to any schedulable task, program, or data communication as a "task."

Scheduler 160 includes a resource identification list 210, which includes a listing of one or more potential tasks and the resource(s) that the task uses. For example, a download task utilizes network bandwidth, storage bandwidth (memory bus), and storage. By contrast, a telephone call task only uses network bandwidth. FIG. 5 lists a number of exemplary tasks and their associated resources.

Prioritizer 220 includes a list of tasks and their relative priorities. For example, a task which is observed by the user is a higher priority than a task which is generally not observed by the user. A task which provides semi-real-time feedback or other data processing is higher priority than a task which provides background download, synchronization, or similar features. In one embodiment, user may use a user interface 225 to prioritize tasks. In one embodiment, the system comes with a default set of priorities, which may be edited or adjusted by the user.

Motion information logic 230 receives motion data. In one embodiment, motion data is received from an accelerometer or other inertial sensor. In one embodiment, motion data is received from a 3-dimensional accelerometer that is part of the device. Motion logic 230 determines a current motion, and based on an identified activity of the user, determines expected future motion as well. For example, if the user is walking at a rapid cadence, it is likely that he or she will continue to walk. If the user is playing a game, he or she is likely to continue moving the device and playing the game.

In one embodiment, the system further includes an active application detector 240. In one embodiment, active application detector detects when an application is active (i.e. being used), even if there is no associated motion. For example, the user may open an application such as a web download application while keeping the mobile device stationary.

Current task scheduler 250 prioritizes current tasks based on prioritizer 220 data and resource ID 210 data. The current tasks are determined by current task scheduler 250 based on active app. detector 240 and motion logic 230.

If the current task scheduler 250 determines that two applications conflict, it can in one embodiment, send a stop message to application stop logic 270. In one embodiment, current task scheduler 250 also then sends the stopped task to future task scheduler 260. In one embodiment, current task scheduler 250 may also utilize resource restrictor 280 to reduce available resources for lower priority tasks. In one embodiment, current task scheduler 250 uses prioritizer data to determine which application(s) to throttle.

Resource restrictor 280 may be used to reduce the available resources to one or more of the currently active applications. This may include reducing available bandwidth.

Future task scheduler 260 receives future tasks for scheduling. In one embodiment, these future tasks may be received from current task scheduler 250. In one embodiment, future tasks may be received from the user. The user may, in one embodiment, add tasks to a list of "future tasks" which should be performed when there are resources available. For example, for a larger download or upload project, the user may indicate that the project is a "future task" instead of directly initializing the task.

Future task scheduler 260 passes a task to current task scheduler 250 when the motion info logic 230 and active application detector 240 indicate that the time is good for performing that task. For example, when the device is not in motion, and there are no applications using network bandwidth, a upload or download future task may be scheduled. In one embodiment, future task scheduler 260 passes tasks for data calls to the server for uploads, downloads, and synchronization to the current task scheduler 250 when the device is idle. In one embodiment, the device is idle when no motion is detected. In one embodiment, the device is idle when no motion is detected and the user is not interacting with any application.

In one embodiment, the system may have tasks that are interruptible (such as downloads) and tasks that are not interruptible (such as installation of applications). In one embodiment, future task scheduler 260 may also have as an input a clock. In one embodiment, the future task scheduler may take into account the likelihood of a user initiating a conflicting task, prior to passing a non-interruptible task to the current task scheduler 250.

Figure 3:
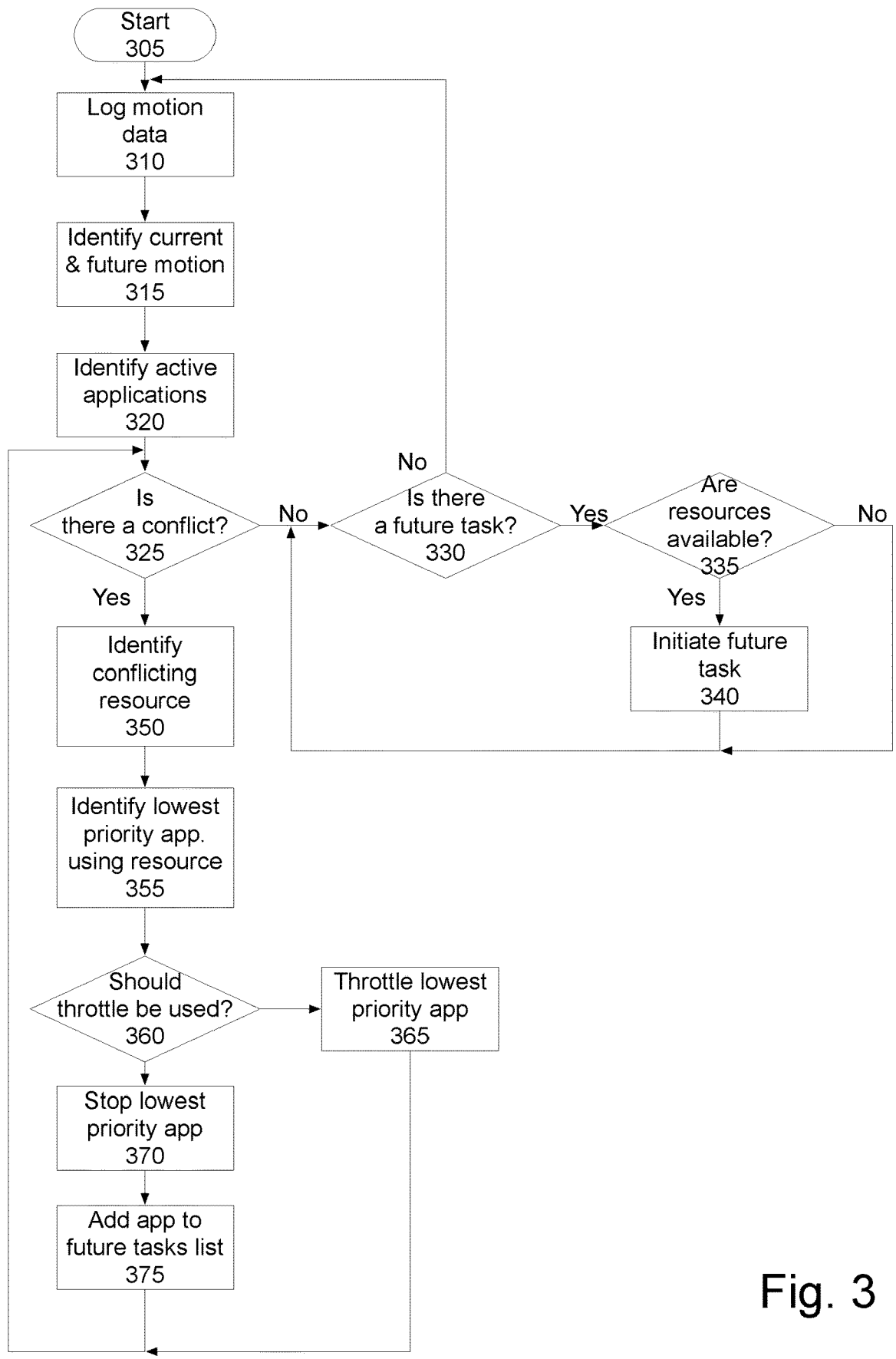
FIG. 3 is a flowchart of one embodiment of scheduling.

FIG. 3 is a flowchart of one embodiment of scheduling. The process starts at block 305.

At block 310, motion data is logged. Motion data is logged, in one embodiment in a buffer or similar temporary memory. At block 315, current motion is identified, and future expected motions are identified. At block 320, the active applications are identified.

At block 320, the process determines whether there is a conflict between the motions/sensors and any current tasks. If there is no conflict, the process continues to block 330. At block 330, the process determines whether there are any future tasks. Future tasks are tasks either scheduled by the user to be executed in the future, or halted previously. If there are no future tasks, the process returns to block 310 to continue logging motion data.

If there are future tasks, the process, at block 335, determines whether there are resources available currently to execute the future task. In one embodiment, this is determined based on the motion data. In one embodiment, this is determined based on the motion data and the active application data. In one embodiment, this is determined based on the motion data and time-of-day data.

If the resources are available, at block 340 the future task is initiated. The process then returns to block 330, to query whether there are any more future tasks to be scheduled. In one embodiment, the future tasks are scheduled in order of priority. That is the first query is for the highest priority future task, then for the next highest priority, and so on. In one embodiment, each future task is evaluated by this process. If there are no remaining future tasks, the process returns to block 310 to continue logging motion data.

If, at block 325, the process found that there was a conflict between the current applications, the process continues to block 350.

At block 350, the conflicting resource is identified. This may include network bandwidth, memory bandwidth, display, etc.

At block 355, the lowest priority application which uses that resource is identified. In one embodiment, the lowest priority resource may be one that is restartable, not viewed or actively utilized by the user. For example, a backup application may be the lowest priority application.

At block 360, the process determines whether throttling should be used. In one embodiment, throttling is always used when available. In one embodiment, throttling is only used if the application is a non-interruptible application. In one embodiment, the user may set a preference for throttling.

If throttling should be used, the process, at block 365 throttles the conflicting application's use of the conflicting resource. The process then returns to block 325, to determine whether there is still a conflict.

If throttling should not be used, at block 370 the lowest priority application is stopped. It is then, at block 375, added to the future tasks list. In this way, the system ensures that the task will be performed at some future time. The process then returns to block 325, to determine whether there is still a conflict.

In this way, the system provides a method to ensure that low priority applications are throttled based on motion data, and potentially other data. Note that while this and other processes are shown in flowchart form, the actual implementation need not be sequential as described. Thus, for example, future tasks may also be monitoring the resource availability for tasks on the list. In one embodiment, conflicts may be tested for every time there is a change in state in the device, i.e. a new application is started, a new motion type is detected, etc.

Figure 4A:
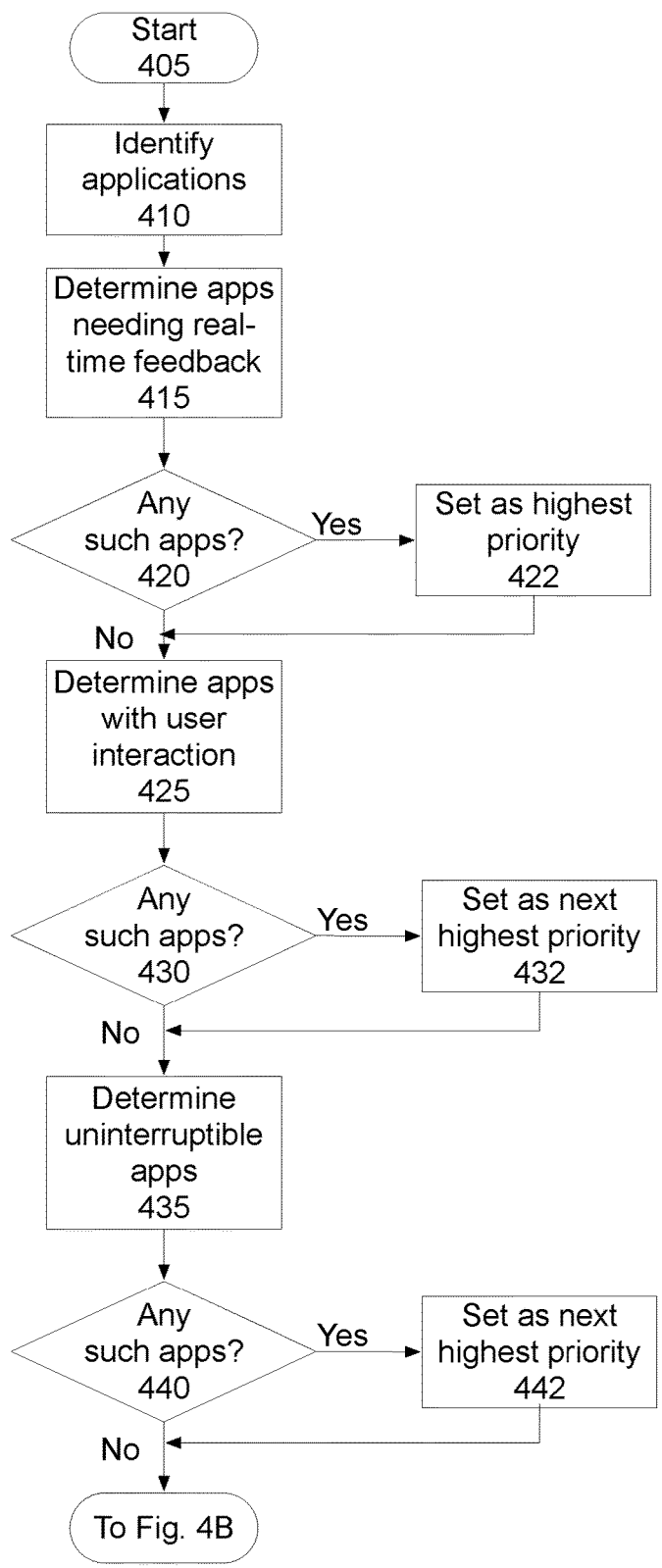
FIGS. 4A and 4B is a flowchart of one embodiment of setting scheduling preferences.
Figure 4B:
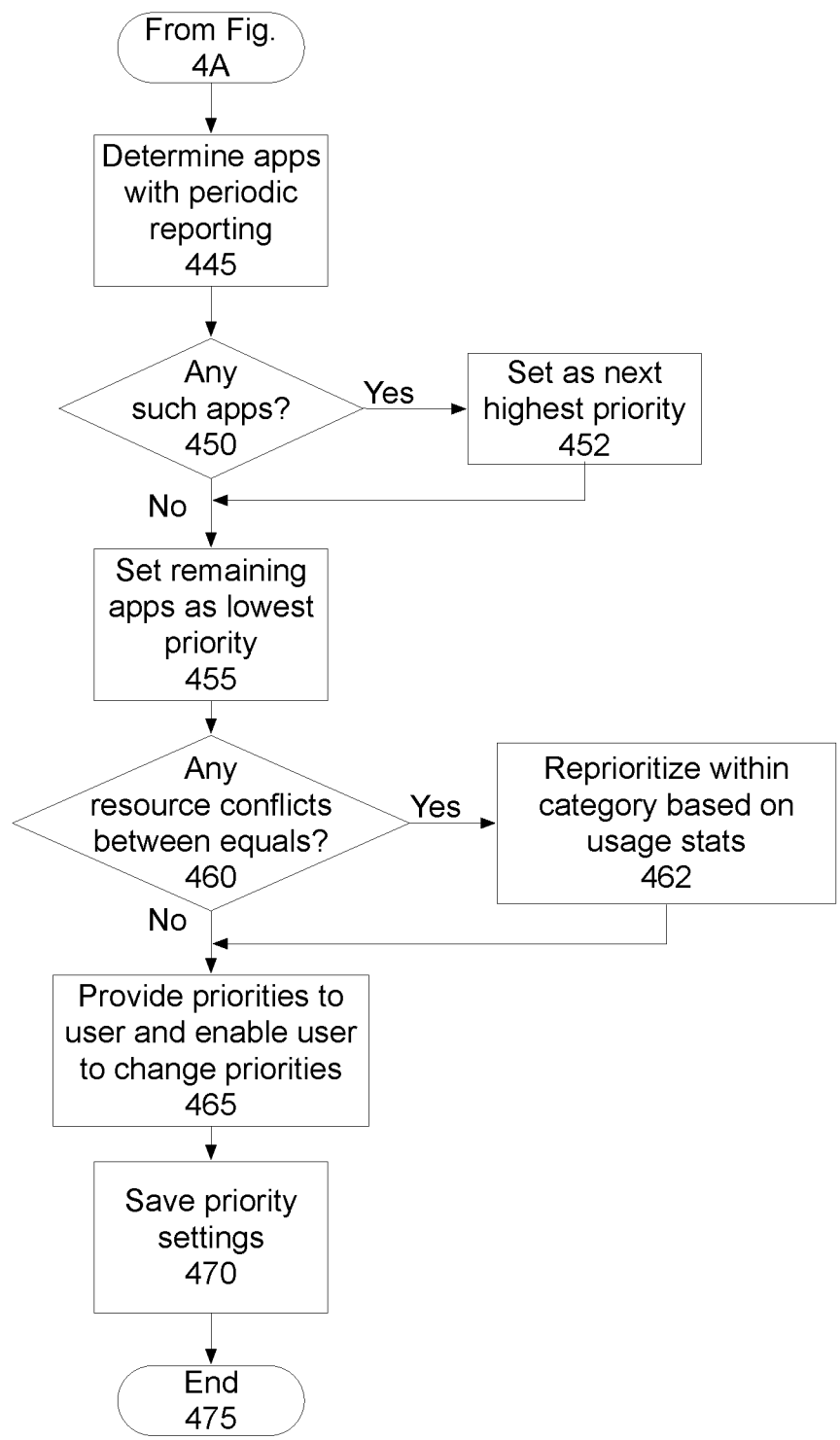

FIGS. 4A and 4B are a flowchart of one embodiment of setting scheduling preferences. The process starts at block 405. In one embodiment, this process is performed on the mobile device. I another embodiment, this process may be performed on a remote server, and the results may be uploaded to the mobile device. In one embodiment, the process may be split between the mobile device and a server.

At block 410, the applications on the mobile device are identified. In one embodiment, this process is triggered each time a new application is added to the mobile device. In one embodiment, only new applications are evaluated and prioritized in that instance.

At block 415, the process identifies any applications needing real-time feedback. Such applications may include sensors which require real-time control commands, applications such as telephone applications where even short delays can impact the user experience.

At block 420, the process determines whether there are any such applications. If so, at block 422, these applications receive the highest priority. The process then continues to block 425. If there are no such applications, the process continues directly to block 425.

At block 425, the process identifies any applications having direct user interactions. Such applications may include games, productivity applications, and other applications where delays can impact the user experience.

At block 423, the process determines whether there are any such applications. If so, at block 432, these applications receive the next highest priority. The process then continues to block 435. If there are no such applications, the process continues directly to block 435.

At block 435, the process identifies any non-interruptible applications. Such applications may include software installation, games requiring periodic memory access, and other applications that cannot be terminated without causing problems.

At block 440, the process determines whether there are any such applications. If so, at block 442, these applications receive the next highest priority. The process then continues to block 445. If there are no such applications, the process continues directly to block 445.

At block 445, the process identifies any applications including periodic reporting. This includes sensors that have periodic updates, applications which report out to the user, applications such as email which use periodic data pulls, etc.

At block 450, the process determines whether there are any such applications. If so, at block 452, these applications receive the next highest priority. The process then continues to block 455. If there are no such applications, the process continues directly to block 455.

At block 455, the remaining applications receive the lowest priority.

At block 460, the process determines whether there is likely conflicts between equally prioritized applications. For example, it is unlikely that a user will be playing two games simultaneously, but the user may walk and make a telephone call at the same time. If there are equally prioritized applications which may conflict, the process continues to block 462.

At block 462, the conflicting applications are reprioritized based on usage statistics or other measurements. In one embodiment, the prioritization occurs within the same category. That is, the lowest priority application within a category is still a higher priority than the highest prioritization in the next lower category. In one embodiment, more frequently used applications receive higher priority. In one embodiment, delay-sensitivity is used for prioritizing within the category. In one embodiment, this step is skipped entirely, and the user is prompted to make prioritization decisions. In one embodiment, if two such applications are found in conflict during use, the one which was activated later is considered the higher priority application.

At block 465, in one embodiment the priorities are provided to the user, and the user is permitted to make changes. In one embodiment, this only occurs if the user specifically requests it. Otherwise, the entire scheduling process is completely transparent to the user, and the user need not be aware of it at all. In one embodiment, if the user lowers the priority of an application which requires real-time feedback or has user interaction, the user is warned of the risk of such a reprioritization.

At block 470, the priorities are saved. The process then ends at block 475. In one embodiment, this process may be invoked by the user at any time, may be automatically triggered periodically, may be triggered whenever a new application is added to the mobile device, or may be started by another trigger.

Figure 6:
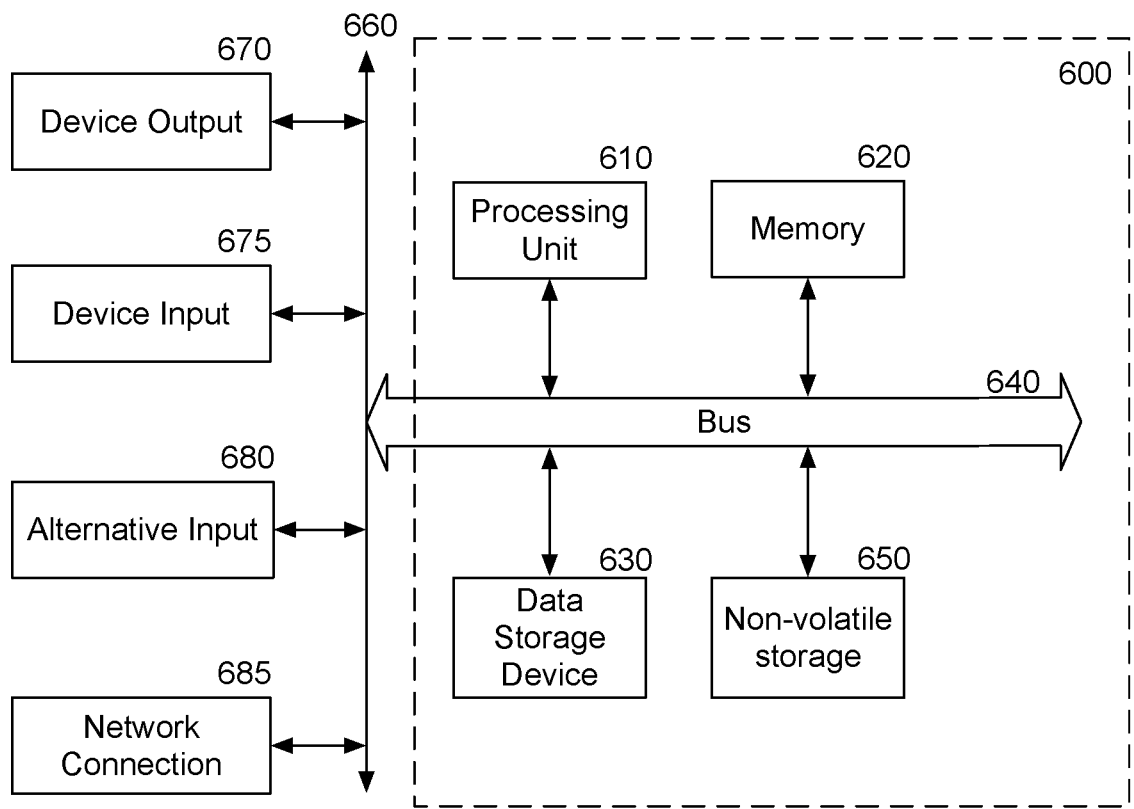
FIG. 6 is a block diagram of a computer system that may be utilized with the present invention.

FIG. 6 is a block diagram of a particular machine that may be used with the present invention. It will be apparent to those of ordinary skill in the art, however that other alternative systems of various system architectures may also be used.

The data processing system illustrated in FIG. 6 includes a bus or other internal communication means 640 for communicating information, and a processing unit 610 coupled to the bus 640 for processing information. The processing unit 610 may be a central processing unit (CPU), a digital signal processor (DSP), or another type of processing unit 610.

The system further includes, in one embodiment, a random access memory (RAM) or other volatile storage device 620 (referred to as memory), coupled to bus 640 for storing information and instructions to be executed by processor 610. Main memory 620 may also be used for storing temporary variables or other intermediate information during execution of instructions by processing unit 610.

The system also comprises in one embodiment a read only memory (ROM) 650 and/or static storage device 650 coupled to bus 640 for storing static information and instructions for processor 610. In one embodiment, the system also includes a data storage device 630 such as a magnetic disk or optical disk and its corresponding disk drive, or Flash memory or other storage which is capable of storing data when no power is supplied to the system. Data storage device 630 in one embodiment is coupled to bus 640 for storing information and instructions.

The system may further be coupled to an output device 670, such as a cathode ray tube (CRT) or a liquid crystal display (LCD) coupled to bus 640 through bus 660 for outputting information. The output device 670 may be a visual output device, an audio output device, and/or tactile output device (e.g. vibrations, etc.)

An input device 675 may be coupled to the bus 660. The input device 675 may be an alphanumeric input device, such as a keyboard including alphanumeric and other keys, for enabling a user to communicate information and command selections to processing unit 610. An additional user input device 680 may further be included. One such user input device 680 is cursor control device 680, such as a mouse, a trackball, stylus, cursor direction keys, or touch screen, may be coupled to bus 640 through bus 660 for communicating direction information and command selections to processing unit 610, and for controlling movement on display device 670.

Another device, which may optionally be coupled to computer system 600, is a network device 685 for accessing other nodes of a distributed system via a network. The communication device 685 may include any of a number of commercially available networking peripheral devices such as those used for coupling to an Ethernet, token ring, Internet, or wide area network, personal area network, wireless network or other method of accessing other devices. The communication device 685 may further be a null-modem connection, or any other mechanism that provides connectivity between the computer system 600 and the outside world.

Note that any or all of the components of this system illustrated in FIG. 6 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 620, mass storage device 630, or other storage medium locally or remotely accessible to processor 610.

It will be apparent to those of ordinary skill in the art that the system, method, and process described herein can be implemented as software stored in main memory 620 or read only memory 650 and executed by processor 610. This control logic or software may also be resident on an article of manufacture comprising a computer readable medium having computer readable program code embodied therein and being readable by the mass storage device 630 and for causing the processor 610 to operate in accordance with the methods and teachings herein.

The present invention may also be embodied in a handheld or portable device containing a subset of the computer hardware components described above. For example, the handheld device may be configured to contain only the bus 640, the processor 610, and memory 650 and/or 620.

The handheld device may be configured to include a set of buttons or input signaling components with which a user may select from a set of available options. These could be considered input device #1 675 or input device #2 680. The handheld device may also be configured to include an output device 670 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 610, a data storage device 630, a bus 640, and memory 620, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 685.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 610. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method comprising:
   identifying one or more resources currently in use by a device;
   identifying current motion information for the device;
   determining predicted future motion for the device; and
   scheduling a future task based on the resources used by other active tasks, the current motion information, and the predicted future motion of the device.

2. The method of claim 1, further comprising:
   scheduling the future task to be immediately executed when the task utilizes resources not currently used by the device.

3. The method of claim 1, further comprising:
   determining that the future task would utilize a particular resource currently used by an other task on the device; and
   when the future task is a higher priority than the other task, reducing resource availability to the other task.

4. The method of claim 3, wherein reducing resource availability comprises terminating the other task by the device.

5. The method of claim 4, wherein when the other task is terminated, the other task is placed on a future task list to be executed when the resource becomes available again.

6. The method of claim 1, further comprising:
   prioritizing tasks based on resource use and application profile.

7. The method of claim 1, wherein the task is transmitting data to a server, and wherein the data transmission task is scheduled when the motion information and the currently active applications indicate that the device is idle.

8. The method of claim 7, wherein the data is for one or more of: uploading, downloading, and synchronizing data with a server.

9. The method of claim 7, wherein the device is idle when the device is motionless, and no user interaction with the device is occurring.

10. The method of claim 7, wherein the device is idle when the device is motionless and no voice call is being made.

11. A device comprising:
a motion sensor to obtain motion information;
resource detector to detect one or more currently used resources; and
a processor to predict a future use characteristic for the device, based on the one or more currently used resources, current motion information of the device, and predicted future motion information; and
a scheduler to schedule one or more tasks to be executed at a future time based on the future use characteristics of the device.

12. The device of claim 11, further comprising:
the scheduler to schedule the task to be immediately executed, when the task utilizes resources not currently used.

13. The device of claim 11, further comprising:
a prioritizer to determine a conflict between the currently used resources and the resources needed by the task; and
when the task is a higher priority, a resource restrictor to reduce resource availability to current users of the resource.

14. The device of claim 13, wherein reducing resource availability comprises terminating the current users of the resource.

15. The mobile device of claim 14, wherein when the existing operation is terminated, the existing operation is placed on a future task list to be executed when the resource becomes available again.

16. The device of claim 11, further comprising:
the scheduler to prioritize tasks based on resource use and application profile.

17. The device of claim 11, wherein the task is transmitting data to a server, and wherein the data transmission task is scheduled when the motion information and the currently active applications indicate that the device is idle.

18. The device of claim 17, wherein the data call is for one or more of: uploading, downloading, and synchronizing data with a server.

19. The device of claim 17, wherein the device is idle when one of the following is occurring: the device is motionless and no user interaction with the device is occurring, or when the device is motionless and no voice call is being made.

20. A device including a network connection comprising:
a motion information logic to receive motion information of a device, and to predict future motion information;
a resource detector to detect current resource usage of the device;
a processor to determine future use characteristics based on the one or more of the current resource usage, the current motion information, and the predicted future motion information;
a scheduler to receive a task to be scheduled to be executed at a future time;
the scheduler to schedule the task for future execution based on the predicted future use characteristics.

* * * * *